(12) United States Patent
Luong et al.

(10) Patent No.: US 11,854,065 B2
(45) Date of Patent: Dec. 26, 2023

(54) METHODS AND NON-TRANSITORY COMPUTER READABLE STORAGE MEDIUM FOR SHOWING AVAILABILITY OF ORDERS FOR CONCIERGE SHOPPING SERVICE

(71) Applicant: Maplebear, Inc., San Francisco, CA (US)

(72) Inventors: Amy Luong, Toronto (CA); Michael Righi, Cary, NC (US); Graham Adeson, San Francisco, CA (US); Ross Stuart Williams, Mill Valley, CA (US); Aman Jain, Toronto (CA); Radhika Anand, Sunnyvale, CA (US); Ganesh Krishnan, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 32 days.

(21) Appl. No.: 17/238,217

(22) Filed: Apr. 23, 2021

(65) Prior Publication Data

US 2022/0343395 A1 Oct. 27, 2022

(51) Int. Cl.
*G06Q 30/00* (2023.01)
*G06Q 30/0601* (2023.01)

(52) U.S. Cl.
CPC ..... *G06Q 30/0635* (2013.01); *G06Q 30/0639* (2013.01); *G06Q 30/0641* (2013.01)

(58) Field of Classification Search
CPC .......... G06Q 30/0635; G06Q 30/0639; G06Q 30/0641
USPC ...................................................... 705/26.81
See application file for complete search history.

(56) References Cited

U.S. PATENT DOCUMENTS

| | | | |
|---|---|---|---|
| 9,778,057 B2* | 10/2017 | O'Mahony | G08G 1/096816 |
| 9,928,540 B1* | 3/2018 | Gerard | G06Q 10/083 |
| 10,133,995 B1* | 11/2018 | Reiss | G06Q 50/12 |
| 10,402,920 B2* | 9/2019 | Fox | G06Q 50/12 |
| 11,023,957 B1* | 6/2021 | Montague | H04W 4/023 |

(Continued)

OTHER PUBLICATIONS

Herrel, K. C. (2006). Geographic significance of delivery zones in an e-commerce-enabled grocery delivery strategy (Order No. 3229724). Available from ProQuest Central; ProQuest Dissertations & Theses Global. (305326325). (Year: 2006).*

(Continued)

*Primary Examiner* — Arielle E Weiner
(74) *Attorney, Agent, or Firm* — Fenwick & West LLP

(57) ABSTRACT

For each retailer in the geographic region, an online system predicts a number of orders placed at the retailer and a capacity to fulfill orders during a forecast time period. The capacity of the retailer is predicted based on a number of pickers expected to be available to the retailer during the forecast time period. The online system determines demand for the services of a picker at the retailer based on a comparison of the predicted number of orders and the predicted capacity to fulfill those orders. The online system displays a user interactive map of the geographic region to the picker. The map displays a pin at the location of each retailer in the geographic region, which describes the categorization determined for the retailer. The picker selects a pin, which causes the user interactive map to display a notification characterizing the demand for services at the retailer.

18 Claims, 6 Drawing Sheets

(56) References Cited

U.S. PATENT DOCUMENTS

| | | | | |
|---|---|---|---|---|
| 11,144,975 | B2* | 10/2021 | Kaiser | G06Q 10/02 |
| 11,169,669 | B1* | 11/2021 | Swett | G06Q 30/0601 |
| 2007/0162353 | A1 | 7/2007 | Borders et al. | |
| 2010/0138037 | A1 | 6/2010 | Adelberg et al. | |
| 2014/0279294 | A1 | 9/2014 | Field-Darragh et al. | |
| 2015/0032502 | A1 | 1/2015 | Green et al. | |
| 2017/0131112 | A1* | 5/2017 | Ogawa | G06Q 50/30 |
| 2017/0293950 | A1* | 10/2017 | Rathod | G06Q 30/0283 |
| 2019/0139258 | A1* | 5/2019 | Slattery | G06V 20/52 |
| 2019/0162550 | A1* | 5/2019 | Rao | G01C 21/3676 |
| 2020/0211142 | A1* | 7/2020 | James | G06Q 30/0284 |

OTHER PUBLICATIONS

Ref U Continued: Retrieved from https://www.proquest.com/dissertations-theses/geographic-significance-delivery-zones-e-commerce/docview/305326325/se-2 (Year: 2006).*

PCT International Search Report and Written Opinion, PCT Application No. PCT/US2022/024693, dated Jul. 27, 2022, 13 pages.

* cited by examiner

METHODS AND NON-TRANSITORY COMPUTER READABLE STORAGE MEDIUM FOR SHOWING AVAILABILITY OF ORDERS FOR CONCIERGE SHOPPING SERVICE

BACKGROUND

This disclosure relates generally to characterizing the demand for service at a retailer and, more specifically, to characterizing the demand for service at a retailer based on a difference between a number of orders that will be placed at the retailer and a capacity to fulfill those orders.

Order delivery systems allow customers to place orders for delivery or pick up. The orders are fulfilled by pickers at stores using a mobile application to aid in finding items for the orders. Pickers tend to position themselves in proximity to a retailer that they expect to have orders available for pickup, for example based on their own past experiences with the retailer or word of mouth from other pickers. However, if the retailer does not have many orders available for pickup, if the retailer is oversaturated with pickers, or both, a picker may waste time searching for available orders where there are none. As a result, it is beneficial for an individual picker to make themselves available to fulfill orders at a retailer with a demand for their services, but individual pickers are unable to obtain real-time or near real-time feedback regarding a retailer's demand for their services.

Conventional online delivery systems are unable to provide an individual picker with such customized feedback because they are unable to predict a retailer's demand for the picker's services due to the constantly changing locations of pickers across geographic regions, the varying number of orders placed at different retailers during different time periods, and the differing eligibilities and capacities of pickers to fulfill orders. Pickers may unexpectedly move from the proximity of one retailer into another within minutes, retailers may receive varying number of orders for a number of reasons, and pickers may be too young to fulfill orders involving alcohol or may not be able to transport orders of a certain size. Accordingly, there exists a need for an online delivery system that provides a picker with real-time feedback regarding the demand of individual retailers for the services of the picker.

SUMMARY

To characterize the demand of a retailer for an individual picker, an online concierge system identifies one or more retailers located within a geographic region. For each one of the one or more retailers, the online concierge system predicts a number of orders that will be placed at the retailer during a forecast time period by customers operating a mobile device. Each predicted order is an order that will be available for a picker to fulfill during the forecast time period. The online concierge system additionally predicts a capacity to fulfill orders during the forecast time period based on a number of pickers expected to be available to the retailer during the forecast time period. Because a picker is capable of fulfilling one or more orders, the number of pickers available to a retailer describes the capacity to fulfill orders placed at a retailer during the forecast time period. The number of pickers available to the retailer may be the number of pickers the online concierge system assigns to the retailer based on their proximity to the retailer.

The online concierge system determines the demand of each retailer in the geographic region for the services of a picker by comparing the predicted number of orders that will be placed at the retailer during the forecast time period to the capacity of pickers available to the retailer during the forecast time period to fulfill orders. The difference between the predicted number of orders and the predicted capacity to fulfill those orders describes the "busyness" of the retailer. Busyness is a measure of a difference between the number of orders available for pickers to fulfill and the number of pickers available to fulfill those orders. When communicated to an individual picker, the busyness of a retailer describes the demand of the retailer for the services of an individual picker. For example, a retailer is characterized as "busy" if the predicted number of orders placed at a retailer is greater than the capacity of the pickers available to the retailer to fulfill those orders. When informed of this characterization, an individual picker recognizes that the retailer has a demand for their services due to the surplus of orders and may make themselves available to the retailer. In comparison, a retailer is characterized as "not busy" if the predicted number of orders placed at a retailer is less than the number of pickers available to fulfill those orders. When informed of this characterization, an individual picker recognizes that the retailer does not have a demand for their services and may make themselves available to another retailer who does have a demand for their services.

The online concierge system generates a user interactive map of the geographic region and communicates the user interactive map to be displayed on a mobile device of a picker. In response to an interaction by the picker, the user interactive map displays a pin at a location of a retailer in the geographic region, which displays a measure of busyness determined for the retailer and a distance between the location of the picker and the location of the retailer. If the busyness measurement determined for a retailer indicates that the number of pickers available to the retailer is insufficient to fulfill the number of orders expected to be placed at the retailer, a picker may make themselves available to the retailer. If the busyness measurement determined for a retailer indicates a surplus of available pickers, the picker may consider other retailers that have a demand for their services and make themselves available to a different retailer.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Environment of an Online Concierge System

Figure 1:
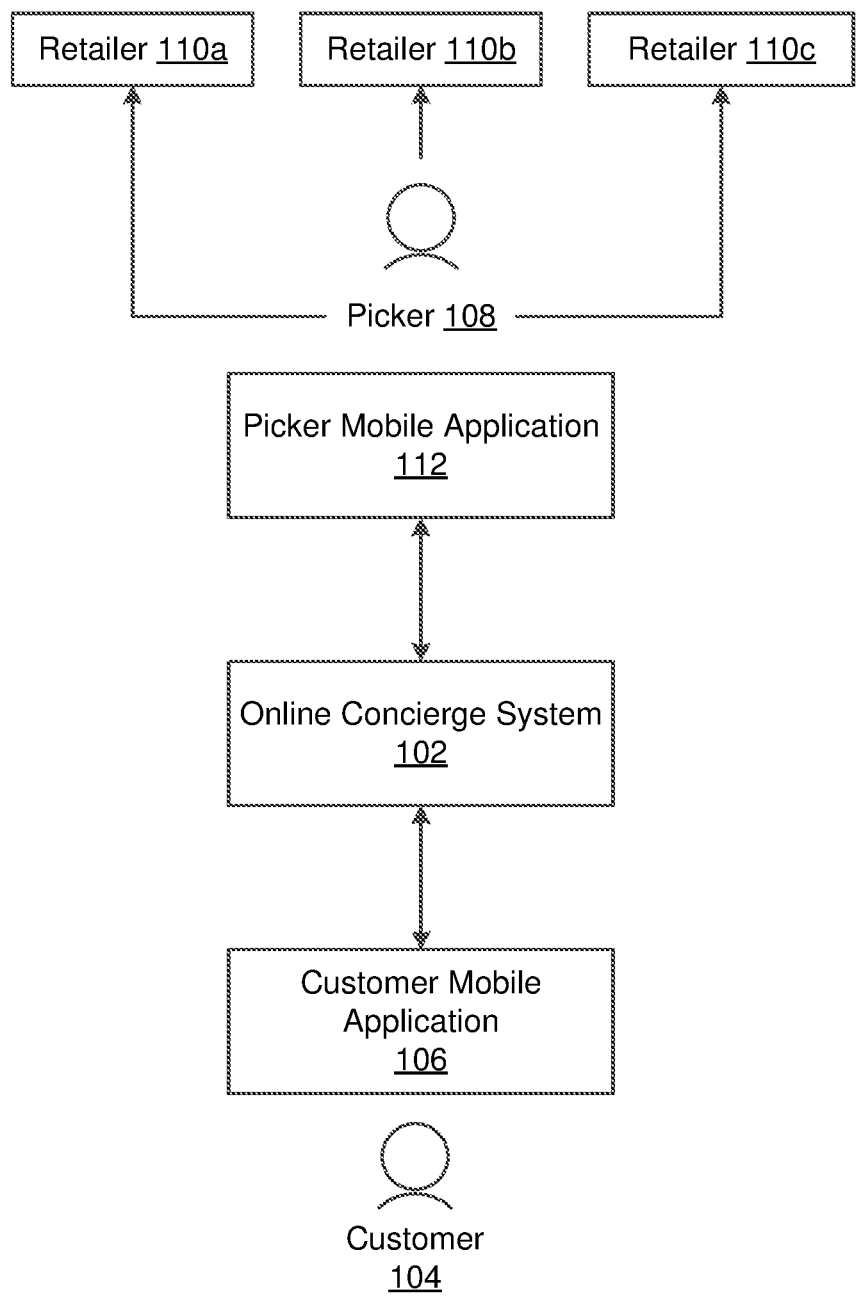
FIG. 1 illustrates the environment of an online concierge system, according to one embodiment.

FIG. 1 illustrates the environment 100 of an online concierge system 102, according to one embodiment. The figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online concierge system 102. The online concierge system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer 104 may use a customer mobile application (CMA) 106 to place the order; the CMA 106 is configured to communicate with the online concierge system 102.

The online concierge system 102 is configured to transmit orders received from customers 104 to one or more pickers 108. A picker 108 may be a contractor, employee, or other person (or entity) who is enabled to fulfill orders received by the online concierge system 102. The environment 100 also includes three retailers 110*a*, 110*b*, and 110*c* (only three are shown for the sake of simplicity; the environment could include hundreds of retailers). The retailers 110 may be physical retailers, such as grocery stores, discount stores, department stores, etc., or non-public warehouses storing items that can be collected and delivered to customers 104. The retailers may also be referred to as warehouse locations. Each picker 108 fulfills an order received from the online concierge system 102 at one or more retailers 110, delivers the order to the customer 104, or performs both fulfillment and delivery. In one embodiment, pickers 108 make use of a picker mobile application 112 which is configured to interact with the online concierge system 102.

Online Concierge System

Figure 2:
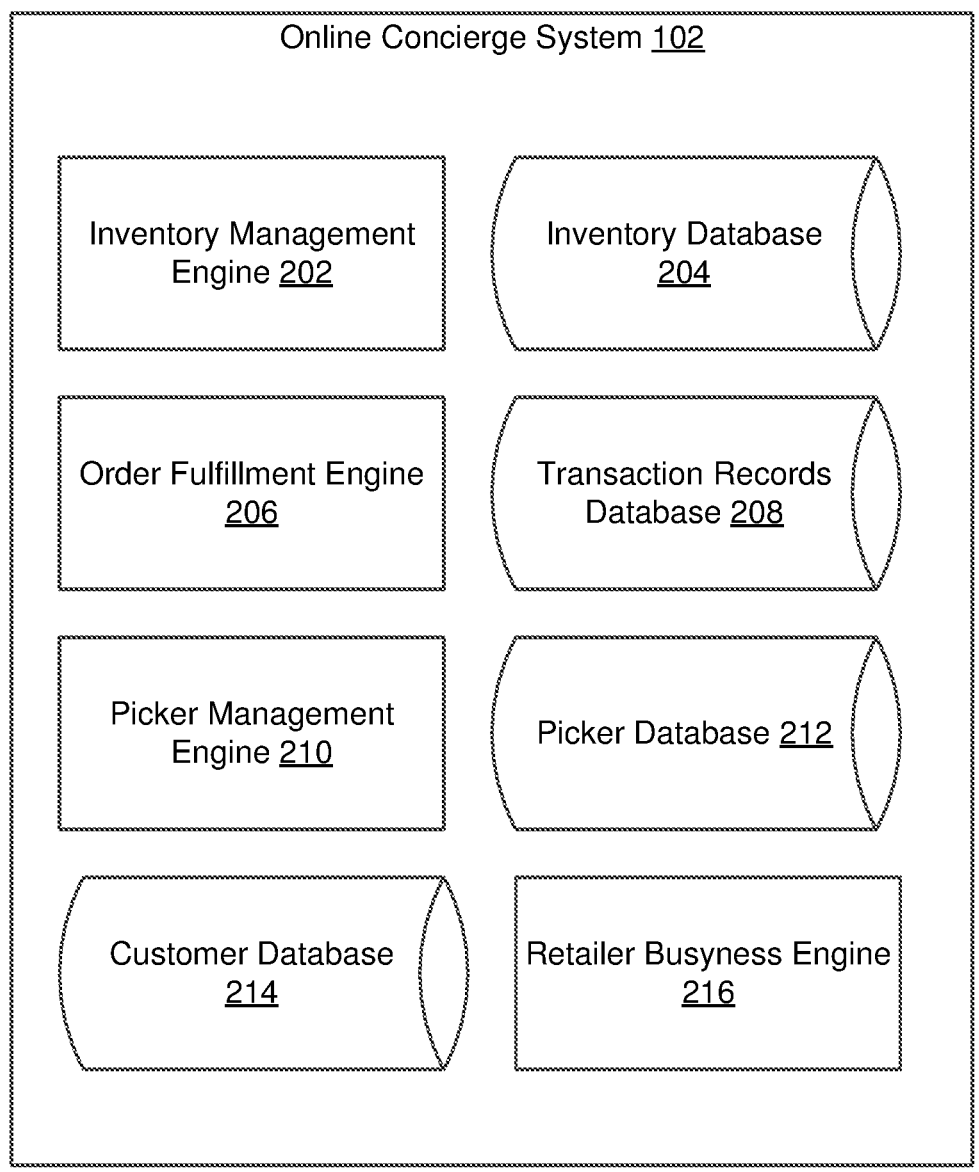
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and pickers 108 would pay at retailers). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

The order fulfillment engine 206 also determines replacement options for items in an order. For each item in an order, the order fulfillment engine 206 may retrieve data describing items in previous orders facilitated by the online concierge system 102, previously selected replacement options for that item, and similar items. Similar items may be items of the same brand or type or of a different flavor. Based on this data, the order fulfillment engine 206 creates a set of replacement options for each item in the order comprising the items from the data. The order fulfillment engine 206 ranks replacement options in the set to determine which items to display to the customer 104. In some embodiments, the order fulfillment engine 206 may rank the replacement options by the number of previous orders containing the replacement option or user quality ratings gathered by the online concierge system 102. In some embodiments, the order fulfillment engine 206 only uses data for the customer 104 related to the order to suggest replacement options.

In some embodiments, the order fulfillment engine 206 also shares order details with retailer 110. For example, after successful fulfillment of an order, the order fulfillment engine 206 may transmit a summary of the order to the appropriate retailer 110. The summary may indicate the items purchased, the total value of the items, and in some cases, an identity of the picker 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. The picker management engine 210 identifies the appropriate retailer 110 to fulfill the order based on one or more parameters, such as the contents of the order, the inventory of the retailers 110, and the proximity to the delivery location. The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 accesses a picker database 212 which stores information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and so on.

The retailer busyness engine 216 characterizes the demand for the services of an individual picker at physical locations of retailers 110 (henceforth referred to as stores) based on a predicted busyness of the stores during a forecast time period. Busyness is a measure of the gap between the number orders available at a retailer for pickers to fulfill and the number of pickers available to fulfill those orders. Thus, when presented to a picker, a metric characterizing a retailer's busyness provides a picker with feedback as to whether the retailer has a demand for their services to fulfill, for example a surplus of orders and a lack of available pickers to fulfill those order, or whether the retailer's demand has already been satisfied, for example a surplus of available pickers to fulfill the number of orders. To allow pickers to manage their location and availability and to improve the likelihood that they are assigned to an order, the retailer busyness engine 216 characterizes a retailer's busyness prospectively. Accordingly, the retailer busyness engine 216 forecasts a retailer's busyness for a future time period. The retailer busyness engine 216 forecasts busyness by comparing a prediction of the number of orders that will be placed at a retailer during a future time period to a prediction of the number of pickers who will be available to the retailer to fulfill those orders. The retailer busyness engine 216 is further described with reference to FIGS. 4-7.

Although, as described herein, the retailer busyness engine 216 provides pickers with feedback regarding a retailer's busyness prospectively based on predictions of the number of orders that will be placed at the retailer and the capacity to fulfill those orders, a person having ordinary skill in the art would appreciate the retailer busyness engine 216 may apply the techniques described herein to characterize a retailer's busyness based on an actual number of orders placed at the retailer during a preceding time period or an actual capacity to fulfill those orders during the preceding time period.

Figure 3A:
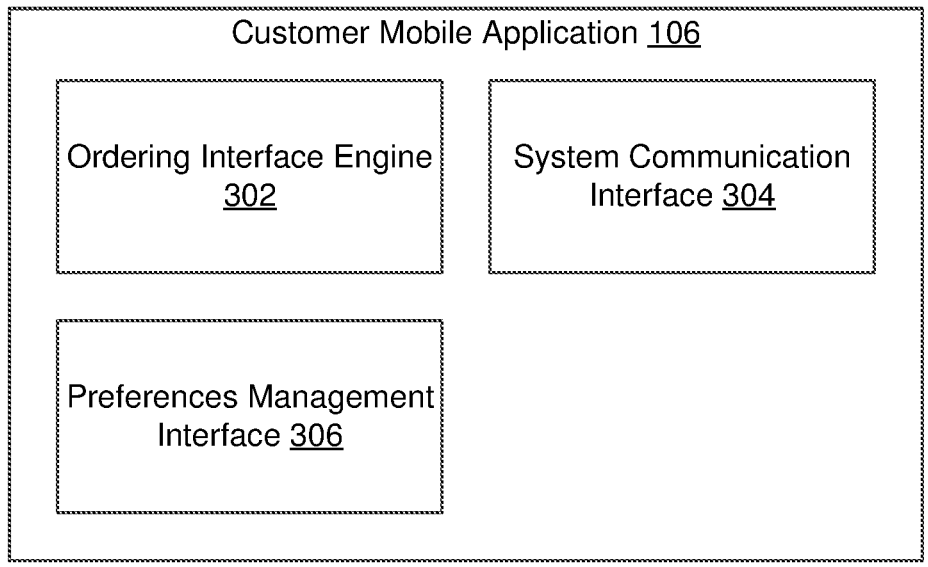
FIG. 3A is a block diagram of the customer mobile application (CMA), according to one embodiment.

FIG. 3A is a block diagram of the customer mobile application (CMA) 106, according to one embodiment. The customer 104 accesses the CMA 106 via a client device, such as a mobile phone, tablet, laptop, or desktop computer. The CMA 106 may be accessed through an app running on the client device or through a website accessed in a browser. The CMA 106 includes an ordering interface 302, which provides an interactive interface, known as a customer ordering interface, with which the customer 104 can browse through and select products and place an order.

Customers 104 may also use the customer ordering interface to message with pickers 108 and receive notifications regarding the status of their orders. Customers 104 may view their orders and communicate with pickers 108 regarding an issue with an item in an order using the customer ordering interface. For example, a customer 104 may respond to a message from a picker 108 indicating that an item cannot be retrieved for the order by selecting a replacement option for the item or requesting a refund via buttons on the customer ordering interface. Based on the chosen course of action, the customer ordering interface generates and displays a template message for the customer 104 to send to the picker 108. The customer 104 may edit the template message to include more information about the item or course of action and communicate back and forth with the picker 108 until the issue is resolved.

The CMA 106 also includes a system communication interface 304 which, among other functions, receives inventory information from the online concierge system 102 and transmits order information to the online concierge system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
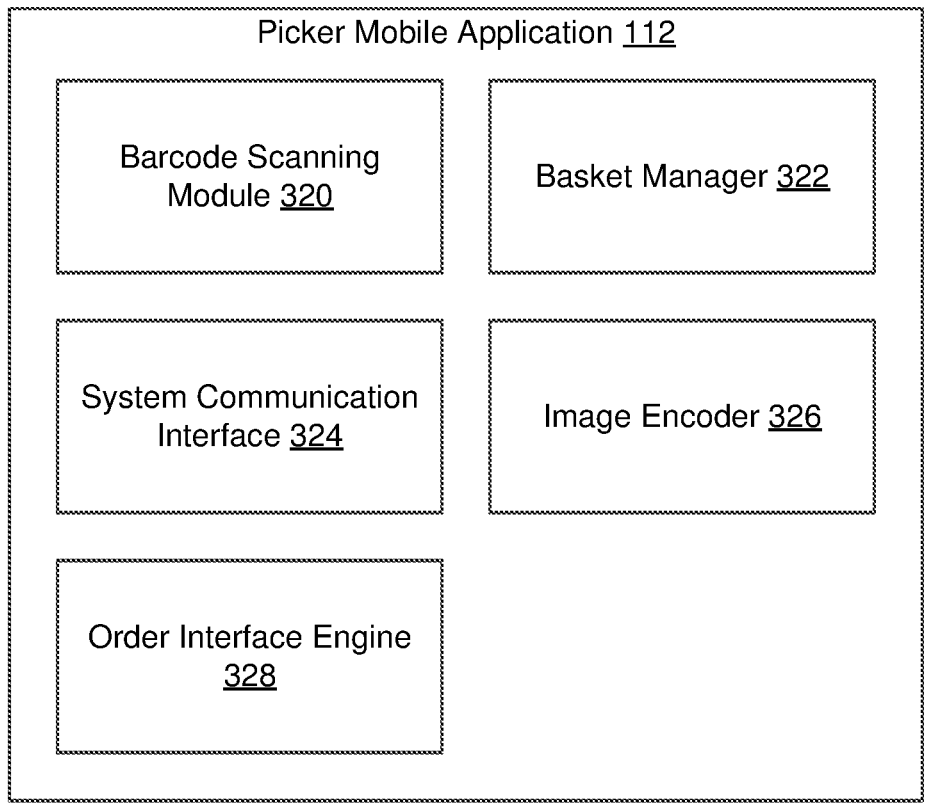
FIG. 3B is a block diagram of the picker mobile application (PMA), according to one embodiment.

FIG. 3B is a block diagram of the picker mobile application (PMA) 112, according to one embodiment. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface 324 may receive notifications and messages from the online concierge system 102 indicating information about an order or communications from a customer 104. The system communication interface 324 may additionally generate a picker order interface to be transmitted via the PMA 112 to a picker to show orders submitted by customers 104, location information about each order, and messages from customers 104. The system communication interface 324 may receive orders and messages from customer 104 via the CMA 106 and location information from the planogram engine 216.

The order interface engine 328 generates a picker order interface, which is an interactive interface through which pickers 108 may interact with customers 104 and receive notifications regarding the status of orders they are assigned. Pickers 108 may view their orders through the picker order interface and indicate when there is an issue with an item in an order, such as not being able to find the item, and when they have picked an item for an order (e.g., via an interactive element or scanning the item). The picker order interface displays location information about orders, such as a map of a store associated with the order, locations of items in the order (e.g., aisle, section, department, etc. of the store), a sequence for picking the items, a route through the store, a picker's location in the store, and the like. The picker order interface is further described with respect to FIGS. 5A-5C.

In some embodiments, the PMA 112 also includes a preferences management interface 306 which allows the picker 108 to manage basic information associated with his/her account, such as his/her name, preferred shopping zone, status, and other personal information. The preferences management interface 306 may also allow the picker 108 to review previous orders and/or his/her shopping level.

Figure 4:
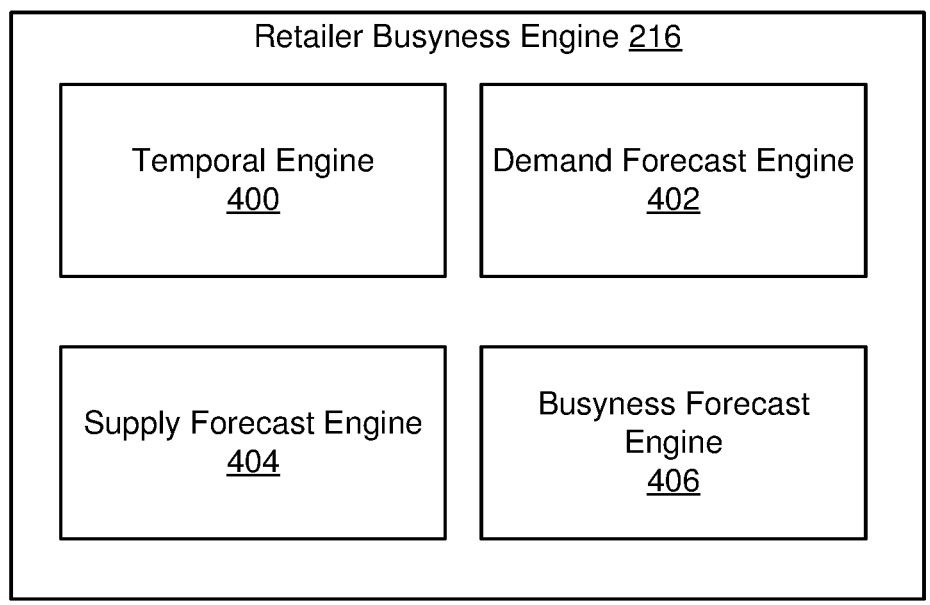
FIG. 4 is a block diagram of a retailer busyness engine, according to one embodiment.

FIG. 4 is a block diagram of retailer busyness engine 216, according to one embodiment. The retailer busyness engine 216 includes a temporal engine 400, a demand forecast engine 402, a supply forecast engine 404, and a busyness forecast engine 406. In some embodiments, the retailer busyness engine 216 has more or different components than those shown in FIG. 4, or the components shown in FIG. 4 may be combined or removed. In other embodiments, the methods and processes described in relation to the retailer busyness engine 216 may be performed at other engines or systems.

The retailer busyness engine 216 periodically forecasts a store's busyness for a future time period. In some embodiments, the retailer busyness engine 216 forecasts busyness for a store at periodic intervals ranging between 15 and 30 minutes. Accordingly, the temporal engine 400 tracks a current time on a picker's mobile device and a location of the picker at the current time. The temporal engine 400 identifies a current time interval that contains the current time and identifies a subsequent time interval that will begin at the conclusion of the current time interval. As described herein, the subsequent time interval is referred to as a forecast time period.

In an example embodiment, the retailer busyness engine 216 generates a busyness forecast for a store in 15-minute intervals. At 12:01 PM, the temporal engine 400 determines that the current time period began 12:00 PM and that the subsequent time period will begin at 12:15 PM. Accordingly, the temporal engine 400 communicates a signal to the remaining components of the retailer busyness engine 216 (e.g., the demand forecast engine 402, the supply forecast engine 404, and the busyness forecast engine 406) to predict the busyness of retailers beginning at 12:15.

The retailer busyness engine 216 may characterize the busyness of a retailer by predicting of a number of pickers who are expected to be available to the retailer during a forecast time period (e.g., the "supply" at the retailer) and predicting a number of orders that will be placed at the retailer during the forecast time period (e.g., the "demand" at the retailer) and determining a difference between the two predictions. Because a picker is capable of fulfilling one or more orders, the number of pickers available to a retailer is directly correlated with and, therefore, is representative of the number of orders that can be fulfilled. Accordingly, the number of pickers available to a retailer also describes the capacity of to fulfill orders placed at the retailer.

The demand forecast engine 402 predicts the number of orders that will be placed at a retailer during a forecast time period by customers operating mobile devices. In addition to a count of orders that will be placed by customers during the forecast time period, the demand forecast engine 402 may also predict the number of orders placed at a retailer based on counts of orders placed prior to the forecast time period that will be fulfilled by a picker during the forecast time period, orders where a picker began to fulfill the order before the forecast time period but will complete fulfillment at some point during the forecast time period, or a combination thereof. As described herein, a picker fulfills an order once the order has been delivered to the customer. Accordingly, the number of orders predicted by the demand forecast engine 402 describes the overall demand of a retailer for a population of pickers during a forecast time period.

The demand forecast engine 402 may implement a machine learned model to predict the number orders that will be placed at a retailer during a forecast time period. In some embodiments, the implemented machine-learned is a regression algorithm, for example a linear regression function. The machine learned model may be trained using a training dataset of orders placed at a retailer during a time period preceding the forecast time period. Data in the training dataset may be labeled with the actual number of orders placed at a retailer during the time period when the data was recorded. In response to receiving a signal from the temporal engine 400 that a current time period has ended, the demand forecast engine 402 may update the training dataset with data collected for retailers during the current time period.

In different implementations, data in the training dataset may be further labeled to reflect the granularity with which the model is trained. In a first embodiment, data in the training dataset may be labeled with the individual retailer from whom the data was collected. Accordingly, the machine learned model may be trained using training data collected for an individual retailer, such that the prediction generated by the machine-learned model is a prediction of the number of orders that will be placed at the individual retailer. In a second embodiment, data in the training dataset may be additionally labeled with a category of the retailer from which the data was collected, for example grocery stores or clothing retailers. Accordingly, the demand forecast engine 402 determine the category of a retailer based on products sold by the retailer, demographics of customers of the retailer, the name of the retailer, or any other relevant characteristic(s) of the retailer.

Data of the training dataset may be assigned a timestamp describing when the data was recorded. The assigned timestamp may describe the time period during the which the data was recorded (e.g., 12:00 PM to 12:15 PM) or the actual time of day (e.g., 12:05 PM). By comparing the timestamp assigned to training data with the label assigned to training data, the machine learned model may consider correlations between different time periods during the day and the number of orders that are historically placed at those time periods when generating a prediction of the number of orders that will be placed at a retailer during a forecast time period.

The number of orders predicted for a forecast time period may include a predicted count of orders that will be placed during the forecast time period, a count of orders that were placed during a preceding time period that have not yet been assigned to a picker, and a count of orders where a picker began to fulfill the order during a preceding time period but did not complete the fulfillment.

The supply forecast engine 404 predicts a capacity to fulfill orders placed at a retailer during a forecast time period. The supply forecast engine 404 generates the prediction based on the count of pickers that are expected to be available to the retailer during the forecast time period and the capacity of each available picker to fulfill orders during the forecast time period. The supply forecast engine 404 determines the number of pickers available to fulfill orders at a retailer by assigning pickers in a geographic region to retailers in the geographic region, for example based on the proximity of a picker to physical location of a retailer. The supply forecast engine 404 may additionally consider the eligibility of individual pickers to fulfill orders at a given retailer, for example a picker under the age of 21 will not be assigned to a liquor store because they are not old enough to fulfill orders placed at the liquor store. The supply forecast engine 404 aggregates the number of orders that can be fulfilled by each picker available to retailer to determine the capacity to fulfill orders placed at the retailer during the forecast time period. Accordingly, the capacity predicted by the supply forecast engine 404 describes the supply of pickers available to fulfill a retailer's demand for pickers.

In some embodiments, the supply forecast engine 404 implements a machine-learned model to assign pickers in a geographic region to retailers in the region and to determine the capacity to fulfill orders placed at each retailer during the forecast time period based on the count of assigned pickers and the capacity of each assigned picker to fulfill orders. The model implemented by the supply forecast engine 404 may be trained in a manner consistent with the above description of the demand forecast engine 404. The supply forecast engine 404 is further described below with reference to FIG. 5.

The busyness forecast engine 406 measures the busyness of a retailer during the forecast time period by determining a difference between the count of orders predicted by the demand forecast engine 402 for the forecast time period and the count of available pickers predicted by the supply forecast engine 404 for the forecast time period. As discussed above, the difference determined by the busyness forecast engine describes the busyness of a retailer. As will be discussed below with regards to FIGS. 7A-B, the busyness of a retailer is presented to individual pickers to provide a picker with feedback as to which retailers have a demand for their services. Accordingly, the busyness measurement determined by the busyness forecast engine 406 describes the demand of a retailer for the services of an individual picker. If the supply of pickers predicted by the supply forecast engine 404 for a retailer is sufficient to satisfy the retailer's demand for pickers predicted by the demand forecast engine 402, the busyness measurement determined by the busyness forecast engine 406 informs an individual picker that their services are not needed by the retailer. Alternatively, if the predicted supply of pickers for a retailer is insufficient to satisfy the retailer's predicted demand for pickers, the busyness measurement informs an individual picker that their services are needed by the retailer.

The busyness forecast engine 406 may implement a smoothing function to refine the busyness measurement determined for a retailer. In some embodiments, the busyness forecast engine 406 implements a binary busyness threshold. If the busyness measurement determined for a retailer is greater than the busyness threshold, the busyness forecast engine 406 labels the retailer as "busy." If the busyness measurement determined for a retailer is less than the busyness threshold, the busyness forecast engine 406 labels the retailer as being "not busy." For example, the busyness forecast engine 406 may label a retailer as "busy" if the busyness measurement is greater than 0 and "not busy" if the busyness measurement is less than 0.

As discussed above, the characterization provided by the busyness forecast engine 406 characterizes the sufficiency of the count of pickers predicted to be available to the retailer to satisfy the retailer's demand for pickers during a forecast time period. As discussed above, when a retailer is identified as "busy," the number of orders expected to be placed at the retailer exceeds the capacity of the pickers predicted to be available to the retailer during a forecast time period. Accordingly, if a picker receives feedback that a retailer is identified as "busy," a picker may be incentivized to navigate towards that retailer to increase the likelihood that they are assigned an order by the picker management engine 210. When a retailer is identified as "not busy," the capacity of pickers predicted to be available to the retailer exceeds the number of orders expected to be placed at the retailer during a forecast time period. Accordingly, if a retailer is identified as "not busy," pickers may be incentivized to navigate to another retailer to increase the likelihood that they are assigned an order by the picker management engine 210.

In other embodiments, the busyness forecast engine 406 implements multiple busyness thresholds to label retailers according to busyness tiers, for example low busyness, medium busyness, and high busyness.

To present the busyness label of a retailer to a picker searching for retailers with a demand for their services, the busyness forecast engine 406 communicates the label of each retailer to the system communication interface 324 of the picker mobile application 112. The system communication interface 324 generates a user interactive map of the geographic region that displays the location of each retailer in the geographic region. In response to a user interaction that selects the location of a retailer, the map overlays the location of the retailer with a pin that displays the label determined by the busyness forecast engine 406, a distance between the location of the retailer and a current location of the picker, or a combination thereof. In some embodiments, the busyness label may be described verbally using text or symbols displayed in the pin. In other embodiments, the busyness categorization may be described visually using colors to represent the varying tiers of busyness. For example, in the embodiment described above where the busyness forecast engine 406 implements multiple busyness thresholds, the color red represents a "high busyness" label, the color orange represents a "medium busyness" label, and a lack of color represents a "low busyness" label. The user interactive map generated by the system communication interface 324 is further described with reference to FIGS. 7A and 7B.

Forecasting Supply for a Retailer

Figure 5:
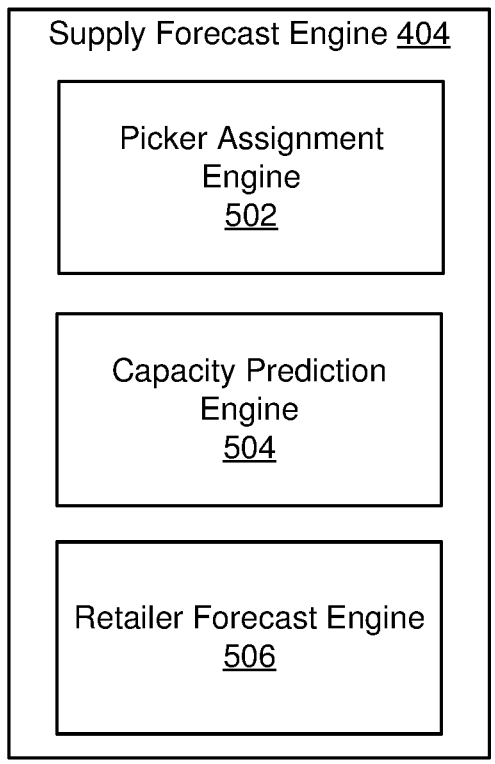
FIG. 5 is a block diagram of a supply forecast engine, according to one embodiment.

FIG. 5 is a block diagram of a supply forecast engine 404, according to one embodiment. The supply forecast engine 404 includes a picker assignment engine 502, a capacity prediction engine 504, and a retailer forecast engine 506. In some embodiments, the supply forecast engine 404 has more or different components than those shown in FIG. 5, or the components shown in FIG. 5 may be combined or removed. In other embodiments, the methods and processes described in relation to the supply forecast engine 404 may be formed at other engines or systems.

To determine the number of pickers available to fulfill orders placed at a retailer, the picker assignment engine 502 assigns pickers in a geographic region to one or more retailers in the geographic region based on the proximity of each picker in the geographic region to each retailer. In large geographic regions or geographic regions that include many retailers, the picker assignment engine 502 may only consider the availability of a picker to retailers located within a threshold distance of the picker. When determining the proximity of a picker to retailers in the geographic region, the supply forecast engine may consider the position of the picker during a preceding time period.

In embodiments where a single retailer is within a threshold distance of a picker the picker assignment engine 502 assigns the picker to the retailer and increments the count of pickers available to the retailer by 1. In embodiments where a picker is equidistant to two or more retailers within a threshold distance of the picker, the picker assignment engine 502 divides the picker's availability equally among the equidistant retailers. For example, if a picker is 1 mile away from both Retailer A and Retailer B, the picker assignment engine 502 increments the number of pickers available to both Retailer A and Retailer B by 0.5. In other embodiments where two or more retailers are within a threshold distance of the picker and each retailer is a different distance from the picker, the picker assignment engine 502 may divide the availability of the picker amongst the retailers based on the distance between the picker and each retailer. For example, if a picker is 1 mile away from retailer A and 2 miles away from retailers B and C, picker assignment engine 502 may increment the number of pickers available to Retailer A by 0.5, increment the number of pickers available to Retailer B by 0.25, and increment the number of pickers available to Retailer C by 0.25.

In other embodiments, the picker assignment engine 502 may not apply a threshold distance and instead assign a picker to whichever retailer is closest to the location of the picker. For example, if a picker is 0.5 miles away from Retailer A, and the next closest retailer (Retailer B) is 3 miles away, the supply forecast engine 404 identifies the picker as available to Retailer A and increments the number of pickers available to Retailer A by 1.

In addition to assigning the pickers to retailers based on proximity, the picker assignment engine 502 may consider the eligibility of a picker to fulfill orders at a given retailer, for example based on their age. Some retailers exclusively sell products that require a picker to satisfy eligibility requirements. A picker may only be eligible to fulfill orders placed at the retailer if they satisfy a threshold age. For example, a picker may only be eligible to fulfill orders placed at a liquor store if they are 21 years old or older. The eligibility requirements for a retailer may be defined manually by an operator associated with the retailer or may be generated in real-time based on products sold by the retailer and listed in an order placed by the customer.

Other retailers sell a combination of products with eligibility requirements and products without eligibility requirements. Accordingly, the eligibility of a picker to fulfill order placed at that retailer may be evaluated on a per-order basis. For such retailers, the demand forecast engine 402 may additionally predict how many of the orders that will be placed at a retailer can only be fulfilled by a picker who satisfies certain eligibility requirements. This additional prediction may be determined based on a history of orders placed at the retailer and a composition of the goods selected in each of those historical orders. The picker assignment engine 502 may consider the predicted number of orders that involve eligibility requirements as a separate demand for the retailer and predict how many eligible pickers will be available to the retailer during the forecast time period to satisfy that demand.

If a picker does not satisfy the eligibility requirements to fulfill orders placed at a retailer, a notification may be presented to the picker that describes the picker's ineligibility in place of, or in addition to, the busyness label determined for the retailer.

When assigning a picker to a retailer, the picker assignment engine 502 may additionally consider the overall demand of the retailer for pickers, for example the number of orders that the demand forecast engine 402 predicts will be placed at the retailer. For example, the demand forecast engine 402 may determine that enough orders will be placed at a retailer during a forecast time period to create a demand for ten pickers and the picker assignment engine 502 may identify eleven pickers as available to the retailer. Accordingly, the picker assignment engine 502 may rank the eleven identified pickers based on their proximity to the retailer and reassign the picker farthest from the retailer to a different retailer. In addition to proximity, the picker assignment engine 502 may also rank pickers assigned to a retailer based on a combination of factors including, but not limited to, a current capacity of a picker to fulfill orders, the eligibility of a picker to fulfill orders at the retailer, a performance rating of a picker, the activity of a picker during preceding time periods, or any other characteristic of a picker that may impact their ability to fulfill orders at the retailer.

The capacity prediction engine 504 predicts the number of orders than can be fulfilled at a retailer based on the capacity of each assigned picker to fulfill orders during the forecast time period. The capacity of a picker may be stored within the picker database 212, determined by the picker management engine 210, or both. The capacity of a picker may be determined based on a combination of factors including, but not limited to, the age of the picker, the size of the picker, and the vehicle that the picker uses. The capacity of a picker to fulfill orders during a forecast time period may additionally be determined based on the time necessary for the picker to navigate to a retailer, the number of orders that the picker can deliver at a time, and the number of orders that the picker is currently assigned to deliver at the beginning of the forecast time period.

As a result, a picker may have a fluctuating capacity to fulfill orders depending on their previous activities, the time of day, or the forecast time period. In one embodiment, the capacity prediction engine 504 generates picker-specific capacity models to predict the capacity of each individual picker assigned to a retailer before the forecast time period begins. In such an embodiment, the capacity predicted by a picker-specific capacity model considers a count of orders that a particular picker is currently fulfilling, a count of orders that the picker has been assigned but has not yet begun to fulfill, the number of orders that the picker can fulfill simultaneously, and whether or not the picker has enough capacity to take on any additional orders. To determine the capacity to fulfill orders placed at a retailer during a forecast time period, the capacity prediction engine 504 aggregates the capacity predicted by the picker-specific capacity model of each picker assigned to the retailer.

Alternatively, the capacity prediction engine 504 may determine a representative capacity for pickers available to a retailer and assigns that representative capacity to each picker assigned to a retailer. In one embodiment, the capacity prediction engine 504 determines a representative capacity for pickers available to a retailer based on historical data describing orders fulfilled by pickers at the retailer during preceding time periods. For example, based on historical data recorded for a retailer during a preceding time period, the capacity prediction engine 504 averages the number of orders that individual pickers have fulfilled at the retailer during the preceding time period. The capacity prediction engine 504 may determine the number of orders that each picker can fulfill may be determined in real-time using the techniques discussed above with regards to the picker-specific capacity models. Alternatively, the capacity prediction engine 504 determines number of orders that each picker can fulfill based on a default capacity of the picker and the activity of the picker during a preceding time period, for example a count of orders assigned to the picker during the preceding time period, a count of those orders that the picker has begun to fulfill, and a count of those orders that the picker has completed fulfilling. In yet another implementation, the capacity prediction engine 504 determines an average capacity of an individual picker based on their history of fulfilling orders during preceding time periods and determines the representative capacity of pickers in the geographic region based on the average capacity determined for each picker.

The retailer forecast engine 506 may forecast the capacity of pickers available to a retailer to fulfill orders during the forecast time period based on the count of pickers assigned to the retailer and the capacity of each assigned picker to fulfill orders. The capacity of pickers available to a retailer may, more generally, be referred to as the capacity of the retailer to fulfill orders during the forecast time period. In embodiments where the capacity prediction engine 504 determines the capacity of each individual picker assigned to a retailer during the forecast time period, the retailer forecast engine 506 predicts the capacity of the retailer by aggregating the capacity of each assigned picker. In other embodiments where the capacity prediction engine 504 determines a representative capacity for pickers in the geographic region, the retailer forecast engine 506 predicts the capacity of the retailer by multiplying the representative capacity by the number of pickers assigned to the retailer.

Figure 6:
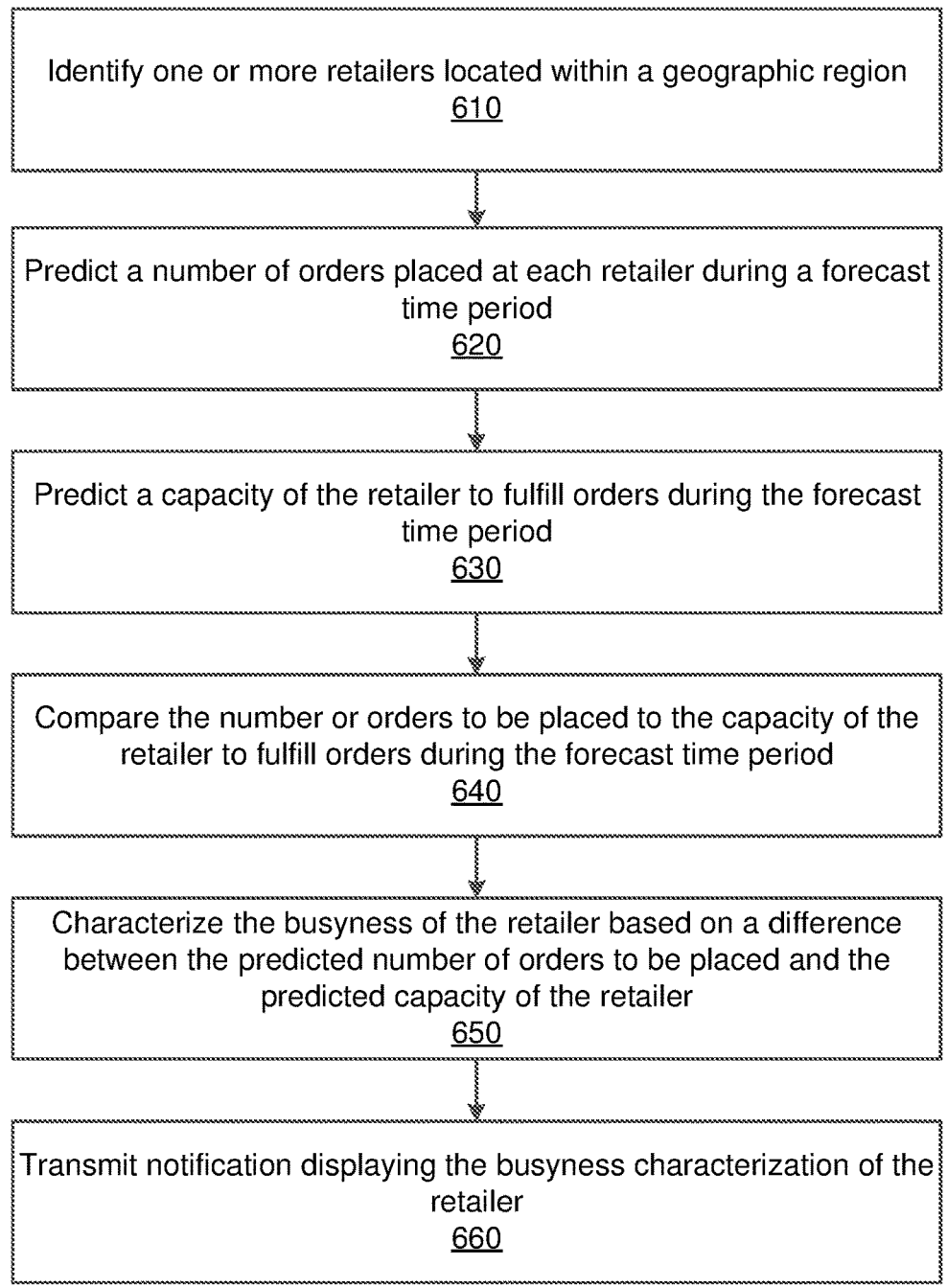
FIG. 6 is a flowchart illustrating a process for characterizing the busyness of a retailer, according to one embodiment.

FIG. 6 is a flowchart illustrating a process for characterizing the busyness of a retailer, according to one embodiment. The retailer busyness engine 216 identifies 610 one or more retailers located within a geographic region. The retailer busyness engine 216 predicts 620 a number of orders that will be placed at each retailer in the geographic region during a forecast period of time. To make the prediction, the retailer busyness engine 216 may implement a machine learned model that is trained based on historical data describing a number of orders placed at the retailer during preceding time periods. In its prediction, the retailer busyness engine 216 considers a count of orders are historically placed at this retailer during the forecast time, a count of orders that were placed during a preceding time period that have not yet been assigned to a picker, a count of orders that have been assigned to a picker but have not yet been fulfilled, a count of orders that a picker has not yet completed fulfilling, or a combination thereof.

The retailer busyness engine 216 predicts 630 a capacity to fulfill orders placed at the retailer during the forecast time period. Because orders are fulfilled by pickers, the capacity to fulfill orders may be determined based on a prediction of the number of pickers that will be available to the retailer to fulfill orders during the forecast time period. To determine the number of pickers available to the retailer, the retailer busyness engine 216 assigns pickers to a retailer based on several considerations including, but not limited to, a distance between the picker and the retailer, a number of orders currently assigned to a picker, and an eligibility of a picker to fulfill orders placed at the retailer. In some embodiments, the retailer busyness engine 216 determines the capacity of individual pickers assigned to the retailer and determines the capacity to fulfil orders during the forecast time period by aggregating the capacity of each assigned picker. In other embodiments, the retailer busyness engine 216 determines a representative capacity, for example an average capacity, of a picker in the geographic region and determines the capacity to fulfill orders based on the representative capacity of a picker in the geographic and the number of pickers assigned to the retailer.

The retailer busyness engine compares 640 the number of orders predicted (620) to be placed at the retailer during the forecast time period to the predicted (630) capacity of the retailer to fulfill orders during the forecast time period. Based on the comparison, the retailer busyness engine 216 determines the difference the predicted number of orders that will be placed at the retailer and the predicted capacity of the retailer to fulfill orders. As discussed above, the determined difference is a measure of the busyness of a retailer, or the demand of that retail for the services an individual picker. The retailer busyness engine 216 characterizes 650 the busyness of the retailer by identifying and assigning the retailer a label describing the measured busyness of the retailer. In one embodiment, if the prediction (620) of the number of orders that will be placed at a retailer is greater than the prediction (630) of the capacity to fulfill orders (e.g., greater than the capacity of the pickers assigned to the retailer to fulfill orders), the retailer busyness engine 216 characterizes the retailer as "busy." In comparison, if the prediction (620) of the number of orders is less than or equal to the prediction (630) of the retailer's capacity to fulfill orders, the retailer busyness engine 216 characterizes the retailer as "not busy."

The retailer busyness engine 216 transmits 660 a notification that is displayed on a mobile device of a picker via the picker mobile application 112. The transmitted notification is a user interactive map of the geographic region with pins identifying the location of each retailer in the geographic region. In response to a picker selecting the pin of a retailer, the busyness measure, for example the assigned label, of the retailer is displayed to a picker to provide the picker with feedback characterizing the retailer's demand for their services so that the picker can position themselves at a location where their services are in demand to improve the likelihood that they are assigned at least one order. The transmitted notification is further discussed below with reference to FIGS. 7A and 7B.

User Interactive Map of a Geographic Region

Figure 7A:
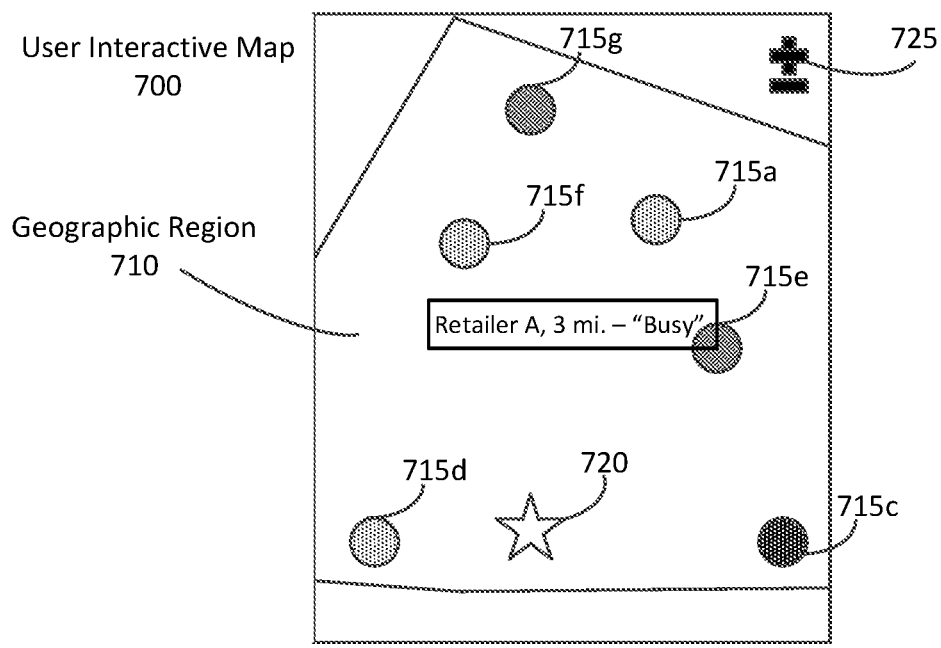
FIGS. 7A and 7B are picker map interfaces for providing feedback to pickers characterizing the busyness of retailers in geographic regions, according to one embodiment.

FIG. 7A is a user interactive map 700 of a geographic region 710 that includes several retailers, according to one embodiment. As discussed above, the map 700 displays a pin 715 over a location of each retailer on the map. In the illustrated embodiment of FIG. 7A, the geographic region 710 includes seven retailers, each of which is represented by a pin 715 (e.g., pins 715a, 715b, 715c, 715d, 715e, 715f, and 715g). As discussed above, the pin displayed over a retailer's location displays the label characterizing the forecasted busyness of the retailer by the retailer busyness engine 216. As illustrated in FIG. 7A, the label characterizing the busyness of a retailer is displayed based on the shading of each pin, but in another embodiments the characterization may be displayed using colors to fill in the pin or varying patterns to outline the pin. In some embodiments (not shown), the pin displayed over a retailer's location displays the distance between the retailer's location and the current location of a picker. In the illustrated embodiment of FIG. 7A, the user interactive map additionally displays the current location of the picker 720.

The user interactive map 700 includes interactive elements that enable the user to gain various insights. Each pin displayed over a retailer is a selectable element of the interactive map. In response to a picker selecting a pin, the user interactive map overlays the map with a notification that includes a verbal description of the retailer's busyness and a distance between the current position of the picker and the location of the retailer. In the illustrated embodiment of FIG. 7A, a picker selects pin 715e which represents the "Retailer A." In response, a notification is displayed that identifies "Retailer A," describes the distance between Retailer A and the current location of the picker 720, and verbally characterizes the busyness of the retailer. Based on the information displayed in the notification, a picker may determine whether they want to make themselves available to a retailer(s) in the geographic region. For example, if a picker is close to a retailer that is label as "busy," the picker recognizes that the retailer has a demand for their services and may position themselves closer to the retailer.

In some embodiments, the picker mobile application 112 initializes a user interactive map of the geographic region where a picker is currently located and displays that map to the picker. Such an initialized map may be consistent with the description above and illustration in FIG. 7A. The picker may be interested in retailers located in other geographic regions surrounding their current geographic region, for example if none of the retailers in the current geographic region are indicated as having a demand for their services. Accordingly, a user may interact with the interactive map by adjusting the focus of the displayed map.

Figure 7B:
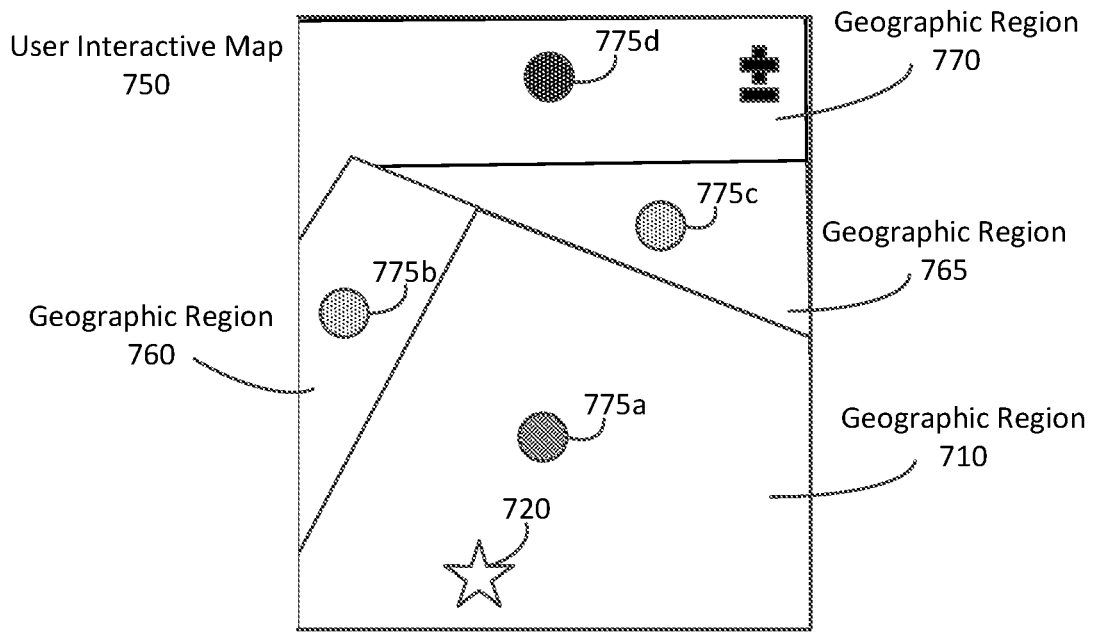

In one embodiment, a picker may adjust the focus of the displayed may be interacting with a zoom scale 725 displayed on the user interactive map to transition the user interactive map from a display of an individual geographic region to a display of the geographic region and surrounding geographic regions. FIG. 7B is a user interactive map 750 of several surrounding geographic regions, according to one embodiment. In addition to the geographic region 710, the user interactive map 750 displays surrounding geographic regions 760, 765, and 770. In such embodiments, the retailer busyness engine 216 determines a busyness measurement for each geographic region displayed in the updated map by aggregating the busyness categorizations of each retailer in the geographic region. In one embodiment, the busyness measurement for the geographic region is determined by averaging the busyness characterization, or alternatively the busyness measurements, determined for each retailer in the geographic region. In another embodiment, the retailer busyness engine 216 identifies a characterization that describes a majority of retailers in the geographic region as the busyness characterization for the entire geographic region. The updated user interactive map additionally displays a pin 775 over each surrounding geographic region describing the busyness characterization for the surrounding geographic region. The user interactive map 750 displays a pin 775a over the region 710, a pin 775b over the surrounding region 760, a pin 775c over the surrounding region 765c, and a pin 775d over the region 770. In the illustrated embodiment, the pin 775a is determined based on an aggregation of the busyness categorizations displayed by the pins 715a, 715b, 715c, 715d, 715e, 715f, and 715g.

In an alternate embodiment (not shown), adjustment of the focus of the displayed map may cause the displayed map of a geographic region to transition to a heatmap of the geographic region and the surrounding geographic regions. In place of, or in addition to, pins overlaying the geographic region and surrounding geographic regions, the heatmap may display the busyness of the geographic region using variations in shading, color, hue, intensity, or any other suitable visual cue across the geographic region and surrounding geographic regions.

In another embodiment, a picker may interact with the user interactive map by swiping away from the currently displayed geographic region to a surrounding geographic region. In such embodiments, the picker mobile application 112 updates the user interactive map to transition from the display of the current geographic region to a display of the surrounding geographic region and retailers located within the surrounding geographic region.

As discussed above, retailer busyness engine 216 may periodically update the busyness characterization determined for retailers in anticipation of a subsequent forecast time period. Accordingly, the user interactive map displayed to a picker is also updated at periodic intervals. The picker mobile application 112 updates the pin displayed at the location of each retailer in the geographic region to describe the busyness characterization determined for the subsequent time period. If the picker has moved to a new position since the last update of the user interactive map, the updated pin also displays the distance between the location of the retailer and the new location of the picker.

After the picker mobile application 112 displays the user interactive map to a picker, the picker may begin to navigation within the geographic region. In such implementations, the user interactive map may be updated in real-time to dynamically display the picker's changing location with the geographic region and the changing distances between the picker and the location of each retailer in the geographic region. During their navigation, a picker may leave their current geographic region and enter a surrounding geographic region. Accordingly, the picker mobile application 112 monitors the location of the picker and identifies the geographic region where the picker is located. When the picker enters a surrounding geographic region, the picker mobile application 112 generates and displays a user interactive map of the surrounding geographic region and each retailer located in the surrounding geographic region. Consistent with the description above and illustration in FIG. 7A, the map displays a pin at the location of each retailer in the surrounding geographic region that describes the busyness characterization of the retailer and a distance between the location of the picker and the location of the retailer.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
identifying a plurality of retailers located within a geographic region;
identifying a plurality of pickers located within the geographic region during a time period;
identifying, for each picker of the plurality of pickers, one or more retailers of the plurality of retailers located within a threshold distance of a location of the picker of the plurality of pickers;
computing a number of pickers available for each of the plurality of retailers by assigning each picker of the plurality of pickers to the identified one or more retailers of the plurality of retailers corresponding to the picker, wherein computing the number of pickers available for each of the plurality of retailers comprises:
determining, for each picker of the plurality of pickers, portions of an availability of the picker to the one or more retailers associated with the picker, wherein the determined portions of the availability of the picker for each of the one or more retailers is based on the distance between the picker and each of the one or more retailers; and
summing, for each retailer of the plurality of retailers, the portions of availabilities of pickers determined for a retailer of the plurality of retailers;
for each retailer of the plurality of retailers,
predicting a number of orders placed at the retailer of the plurality of retailers during a forecast time period, wherein each order of the number of orders is placed by a customer operating a mobile device;
determining an expected number of pickers available to the retailer during the forecast time period based on the computed number of pickers available to the retailer of the plurality of retailers;
predicting a capacity to fulfill orders during the forecast time period based on an expected number of pickers available to the retailer of the plurality of retailers during the forecast time period, wherein each picker of the expected number of pickers is capable of fulfilling one or more orders; and
determining a demand for picker services at the retailer of the plurality of retailers based on a comparison of the predicted number of orders placed at the retailer of the plurality of retailers during the forecast time period and the capacity to fulfill orders during the forecast time period;

generating, for display on a mobile device of a picker, a user interactive map of the geographic region, the user interactive map displaying a location of each retailer of the plurality of retailers in the geographic region and pins overlaying the location of each retailer of the plurality of retailers; and responsive to the picker selecting a pin overlaying the location of the retailer of the plurality of retailers, updating the user interactive map to display a notification characterizing the demand at the retailer of the plurality of retailers for picker services during the forecast time period.

2. The method of claim 1, wherein the user interactive map further comprises a zoom scale, the method further comprising:

receiving an input of the picker interacting with the zoom scale to reduce a scale of the user interactive map, responsive to receiving the input of the picker interacting with the zoom scale, determining a demand for picker services in the geographic region by aggregating the demand for picker services at each retailer of the one or more retailers;

updating the user interactive map to display a second map of the geographic region and a plurality of surrounding geographic regions, the updated user interactive map displaying a pin overlaying the geographic region and a pin overlaying each surrounding geographic region of the plurality of surrounding geographic regions; and receiving an input from the picker selecting the pin overlaying the geographic region, wherein the selection causes the user interactive map to display the demand for picker services in the geographic region.

3. The method of claim 1, wherein the user interactive map further comprises a zoom scale, the method further comprising:

receiving an input of the picker interacting with the zoom scale to reduce a scale of the user interactive map;

responsive to receiving the input of the picker interacting with the zoom scale, determining a demand for picker services in the geographic region by aggregating the demand for picker services at each retailer of the one or more retailers; and updating the user interactive map to display a heatmap of the geographic region and a plurality of surrounding geographic regions, wherein the heatmap displays the demand for picker services in each of the geographic region and the surrounding geographic regions using color.

4. The method of claim 1, further comprising: at periodic intervals, determining a demand for picker services at each retailer of the plurality of retailers in the geographic region for a subsequent forecast time period; and updating the user interactive map, wherein the updated user interactive map displays an updated pin overlaying the location of each retailer of the plurality of retailers; and receiving an input from the picker selecting an updated pin overlaying the location of the retailer of the plurality of retailers, wherein the selection causes the updated user interactive map to display a notification characterizing the demand for picker services at the retailer of the plurality of retailers for the subsequent forecast time period.

5. The method of claim 1, further comprising:

determining that the picker is located beyond the geographic region in response to the picker moving to a new location;

identifying a second geographic region that includes the new location of the picker;

generating, for display on the mobile device of the picker, a second user interactive map of the second geographic region, the second user interactive map displaying a location of each retailer in the second geographic region and a pin overlaying the location of each retailer in the second geographic region; and receiving an input from the picker selecting a pin overlaying the location of a retailer in the second geographic region, wherein the selection causes the second user interactive map to display a notification characterizing a demand for picker services at the retailer.

6. The method of claim 1, wherein the number of orders placed at the retailer of the plurality of retailers during the forecast time period further comprises one or more of:

a count of orders placed by customers during a time period preceding the forecast time period that were not assigned to the plurality of pickers;

a count of orders placed by customers operating mobile devices before the preceding time period that were not assigned to the plurality of pickers; and a count of orders that were fulfilled by the plurality of pickers during the preceding time period.

7. The method of claim 1, further comprising:

determining the number of orders that each picker of the plurality of pickers can fulfill during the forecast time period;

determining a representative number of orders that pickers of the plurality of pickers can fulfill by averaging the number of orders determined for each picker of the plurality of pickers; and predicting the capacity to fulfill orders during the forecast time period based on the expected number of pickers available to the retailer of the plurality of retailers and the representative number of orders that pickers of the plurality of pickers can fulfill.

8. The method of claim 1, further comprising:

receiving a signal identifying each of a plurality of pickers located in the geographic region during a preceding time period;

for each retailer of the plurality of retailers,
accessing one or more eligibility conditions of pickers available to the retailer of the plurality of retailers; and
identifying a first subset of pickers of the plurality of pickers that satisfy the one or more eligibility conditions and a second subset of pickers of the plurality of pickers that do not satisfy the one or more eligibility conditions; and determining that pickers of the second subset are not available to the retailer of the plurality of retailers.

9. The method of claim 1, wherein determining the demand for picker services at the retailer of the plurality of retailers further comprises:

determining a difference between the number orders placed at the retailer of the plurality of retailers during the forecast time period and the capacity to fulfill orders during the forecast time period, wherein the difference represents the demand for picker services at the retailer of the plurality of retailers;

comparing the difference to a busyness threshold; and responsive to the difference being greater than the busyness threshold, determining that the demand for picker services at the retailer of the plurality of retailers indicates a lack of available pickers in the geographic region during the forecast time period.

10. A non-transitory computer readable storage medium comprising instructions that, when executed by a processor, cause the processor to:
identify a plurality of retailers located within a geographic region;
identify a plurality of pickers located within the geographic region during a time period;
identify, for each picker of the plurality of pickers, one or more retailers of the plurality of retailers located within a threshold distance of a location of the picker of the plurality of pickers;
compute a number of pickers available for each of the plurality of retailers by assigning each picker of the plurality of pickers to the identified one or more retailers of the plurality of retailers corresponding to the picker, wherein computing the number of pickers available for each of the plurality of retailers comprises:
determining, for each picker of the plurality of pickers, portions of an availability of the picker to the one or more retailers associated with the picker, wherein the determined portion of the availability of the picker for each of the one or more retailers is based on the distance between the picker and each of the one or more retailers; and
summing, for each retailer of the plurality of retailers, the portions of availabilities of pickers determined for a retailer of the plurality of retailers;
for each retailer of the plurality of retailers,
predict a number of orders placed at the retailer of the plurality of retailers during a forecast time period, wherein each order of the number of orders is placed by a customer operating a mobile device;
determine an expected number of pickers available to the retailer during the forecast time period based on the computed number of pickers available to the retailer of the plurality of retailers;
predict a capacity to fulfill orders during the forecast time period based on an expected number of pickers available to the retailer of the plurality of retailers during the forecast time period, wherein each picker of the expected number of pickers is capable of fulfilling one or more orders; and
determine a demand for picker services at the retailer of the plurality of retailers based on a comparison of the predicted number of orders placed at the retailer of the plurality of retailers during the forecast time period and the capacity to fulfill orders during the forecast time period;
generate, for display on a mobile device of a picker, a user interactive map of the geographic region, the user interactive map displaying a location of each retailer of the plurality of retailers in the geographic region and pins overlaying the location of each retailer of the plurality of retailers; and
responsive to the picker selecting a pin overlaying the location of the retailer of the plurality of retailers, update the user interactive map to display a notification characterizing the demand at the retailer of the plurality of retailers for picker services during the forecast time period.

11. The non-transitory computer readable storage medium of claim 10, wherein the user interactive map further comprises a zoom scale, the instructions further causing the processor to:
receive an input of the picker interacting with the zoom scale to reduce a scale of the user interactive map,
responsive to receiving the input of the picker interacting with the zoom scale, determine a demand for picker services in the geographic region by aggregating the demand for picker services at each retailer of the one or more retailers;
update the user interactive map to display a second map of the geographic region and a plurality of surrounding geographic regions, the updated user interactive map displaying a pin overlaying the geographic region and a pin overlaying each surrounding geographic region of the plurality of surrounding geographic regions; and
receive an input from the picker selecting the pin overlaying the geographic region, wherein the selection causes the user interactive map to display the demand for picker services in the geographic region.

12. The non-transitory computer readable storage medium of claim 10, wherein the user interactive map further comprises a zoom scale, the instructions further causing the processor to:
receive an input of the picker interacting with the zoom scale to reduce a scale of the user interactive map;
responsive to receiving the input of the picker interacting with the zoom scale, determine a demand for picker services in the geographic region by aggregating the demand for picker services at each retailer of the one or more retailers; and
update the user interactive map to display a heatmap of the geographic region and a plurality of surrounding geographic regions, wherein the heatmap displays the demand for picker services in each of the geographic region and the surrounding geographic regions using color.

13. The non-transitory computer readable storage medium of claim 10, wherein the instructions further cause the processor to:
at periodic intervals,
determine a demand for picker services at each retailer of the plurality of retailers in the geographic region for a subsequent forecast time period; and
update the user interactive map, wherein the updated user interactive map displays an updated pin overlaying the location of each retailer of the plurality of retailers; and
receive an input from the picker selecting an updated pin overlaying the location of the retailer of the plurality of retailers, wherein the selection causes the updated user interactive map to display a notification characterizing the demand for picker services at the retailer of the plurality of retailers for the subsequent forecast time period.

14. The non-transitory computer readable storage medium of claim 10, wherein the instructions further cause the processor to:
determine that the picker is located beyond the geographic region in response to the picker moving to a new location;
identify a second geographic region that includes the new location of the picker;
generate, for display on the mobile device of the picker, a second user interactive map of the second geographic region, the second user interactive map displaying a location of each retailer in the second geographic region and a pin overlaying the location of each retailer in the second geographic region; and receive an input from the picker selecting a pin overlaying the location of a retailer in the second geographic region, wherein the selection causes the second user interactive map to display a notification characterizing a demand for picker services at the retailer.

15. The non-transitory computer readable storage medium of claim 10, wherein the number of orders placed at the retailer of the plurality of retailers during the forecast time period further comprises one or more of:
    a count of orders placed by customers during a time period preceding the forecast time period that were not assigned to the plurality of pickers;
    a count of orders placed by customers operating mobile devices before the preceding time period that were not assigned to the plurality of pickers; and
    a count of orders that were fulfilled by the plurality of pickers during the preceding time period.

16. The non-transitory computer readable storage medium of claim 10, wherein the instructions further cause the processor to:
    determine the number of orders that each picker of the plurality of pickers can fulfill during the forecast time period;
    determine a representative number of orders that pickers of the plurality of pickers can fulfill by averaging the number of orders determined for each picker of the plurality of pickers; and
    predict the capacity to fulfill orders during the forecast time period based on the expected number of pickers available to the retailer of the plurality of retailers and the representative number of orders that pickers of the plurality of pickers can fulfill.

17. The non-transitory computer readable storage medium of claim 10, wherein the instructions further cause the processor to:
    receive a signal identifying each of a plurality of pickers located in the geographic region during a preceding time period;
    for each retailer of the plurality of retailers,
        access one or more eligibility conditions of pickers available to the retailer of the plurality of retailers; and
        identify a first subset of pickers of the plurality of pickers that satisfy the one or more eligibility conditions and a second subset of pickers of the plurality of pickers that do not satisfy the one or more eligibility conditions; and
    determine that pickers of the second subset are not available to the retailer of the plurality of retailers.

18. The non-transitory computer readable storage medium of claim 10, wherein the instructions for determining the demand for picker services at the retailer of the plurality of retailers further cause the processor to:
    determine a difference between the number orders placed at the retailer of the plurality of retailers during the forecast time period and the capacity to fulfill orders during the forecast time period, wherein the difference represents the demand for picker services at the retailer of the plurality of retailers;
    compare the difference to a busyness threshold; and
    responsive to the difference being greater than the busyness threshold, determine that the demand for picker services at the retailer of the plurality of retailers indicates a lack of available pickers in the geographic region during the forecast time period.

* * * * *